Feb. 7, 1933.　　　E. R. ZADEMACH　　　1,896,151
CONVEYER BELT
Filed Jan. 9, 1930　　　2 Sheets-Sheet 1
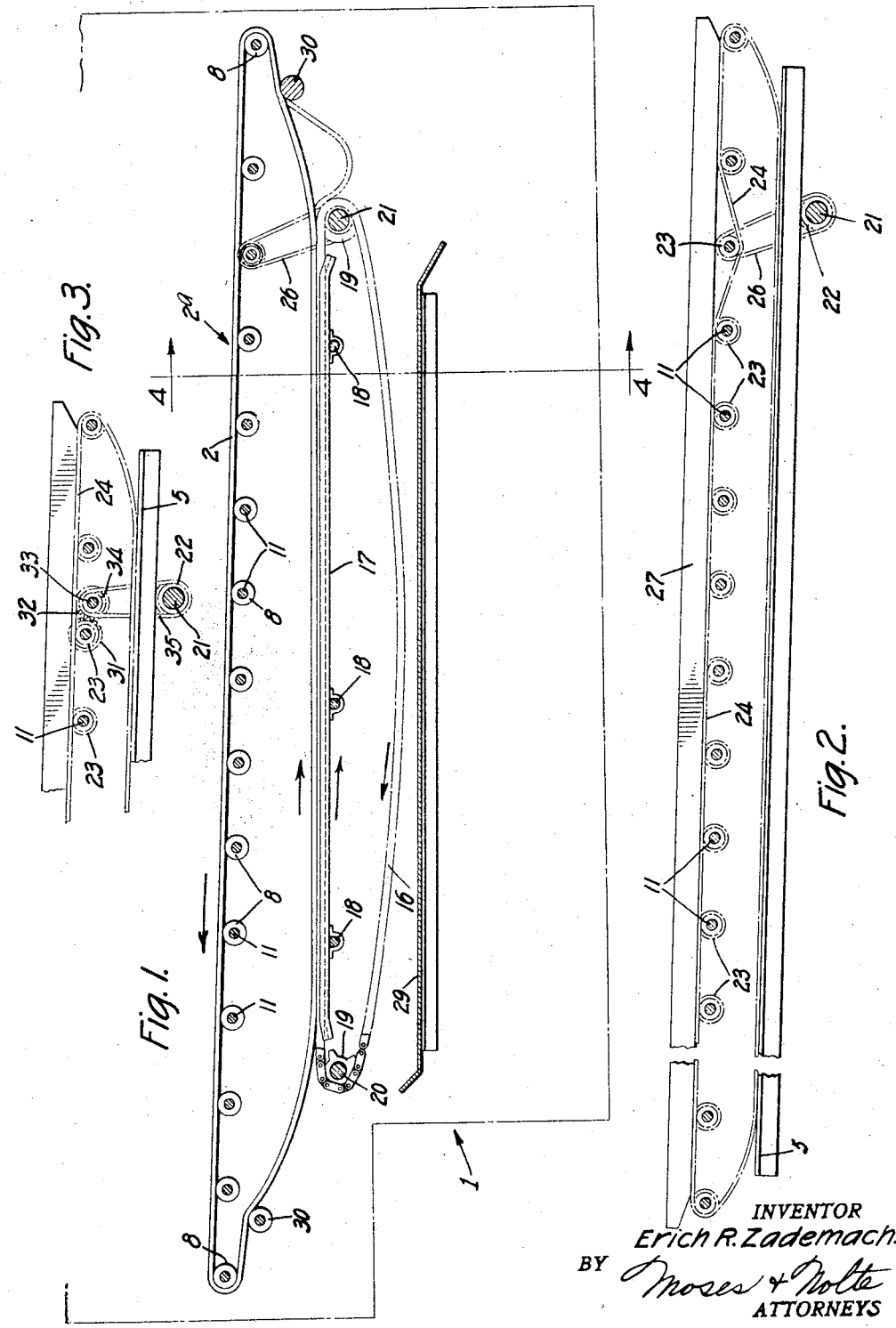
INVENTOR
Erich R. Zademach.
BY Moses + Nolte
ATTORNEYS Feb. 7, 1933. E. R. ZADEMACH 1,896,151
CONVEYER BELT
Filed Jan. 9, 1930 2 Sheets-Sheet 2
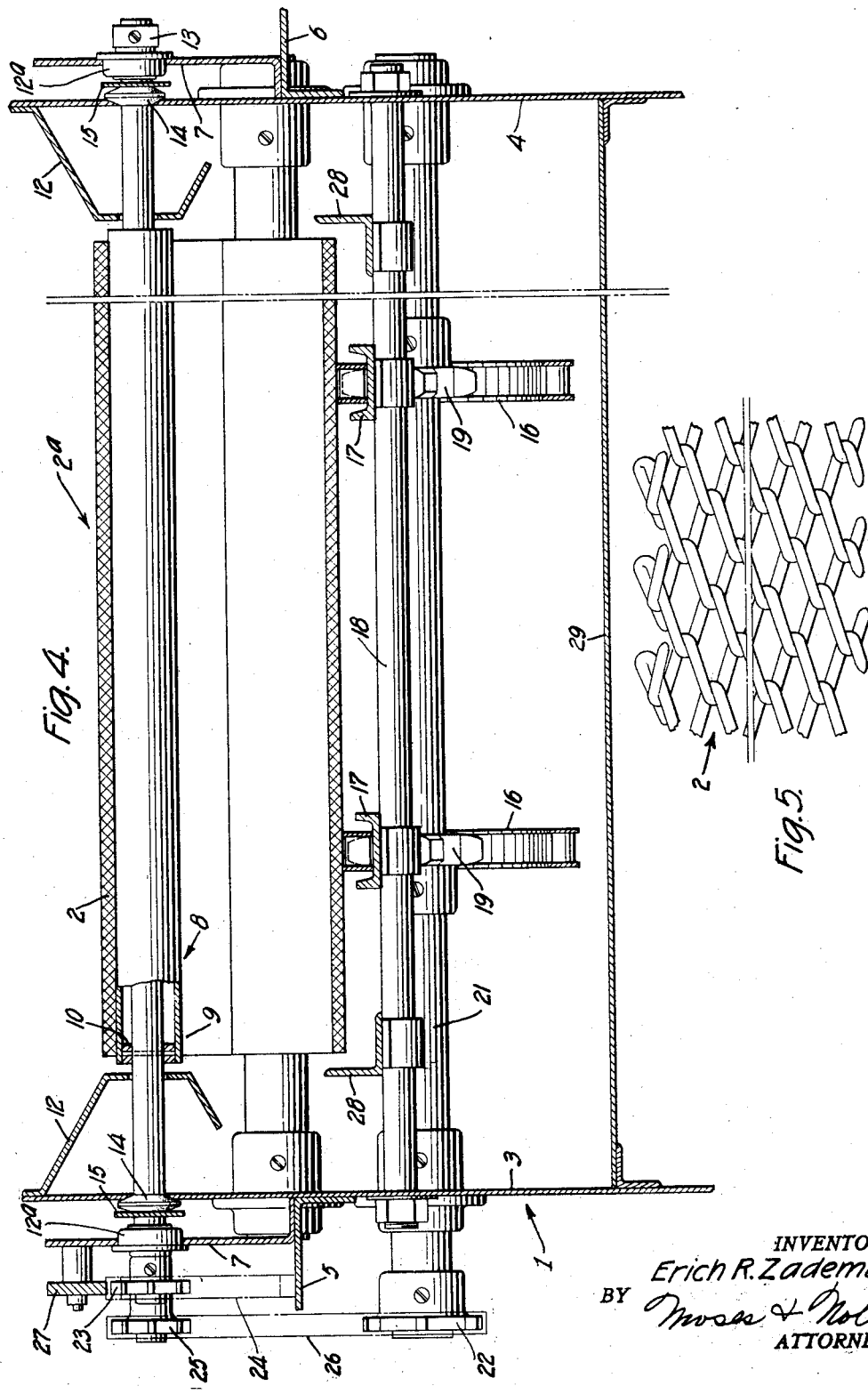
INVENTOR
Erich R. Zademach.
BY
ATTORNEYS Patented Feb. 7, 1933

1,896,151

UNITED STATES PATENT OFFICE

ERICH R. ZADEMACH, OF ELIZABETH, NEW JERSEY, ASSIGNOR TO METALWASH MACHINERY COMPANY, OF NEW YORK, N. Y., A COPARTNERSHIP CONSISTING OF HERMAN O. BOEHME, ERICH R. ZADEMACH AND ALBERT C. NOLTE

CONVEYER BELT

Application filed January 9, 1930. Serial No. 419,536.

This invention relates to conveyers for use in treating apparatus or for other purposes.

It is an object of the invention to provide a conveyer of the belt type which can be operated rapidly and without danger of breakage, which requires little power for its operation, which involves little wear in use, which is adaptable for use in different kinds of work, and which is less subject, than those heretofore in use, to damage or deterioration resulting from the weight of the idle stretch of the conveyer belt.

It is a further object of the invention to provide a belt conveyer in which the idle stretch thereof is supported and driven (fast enough to provide slack adjacent to the receiving end of the active stretch of the belt and to effect automatic take up of the belt at the discharge end of the active stretch) by means preferably including an endless traveling device of which the upper stretch acts to support the idle stretch of the conveyer belt.

Other objects and advantages will hereinafter appear.

In the drawings forming a part of this specification:

Fig. 1 is a side elevation, partly in section, of an article treating apparatus embodying the conveyer of the present invention;

Fig. 2 is a side elevation, partly in section, showing features of the conveyer driving means;

Fig. 3 is a fragmentary side elevation, partly in section, showing a modified form of conveyer driving means;

Fig. 4 is a transverse, vertical section through the conveyer taken on the line 4—4 of Fig. 3; and Fig. 5 is a detail plan view showing a fragment of the conveyer belt.

The conveyer of the present invention is shown for purposes of illustration as embodied in a treating apparatus including a tank in which articles carried by the belt are washed or otherwise treated as they are carried through the tank. The conveyer may, however, be useful in other kinds of apparatus and for other purposes. For example, the conveyer may be used to advantage in drying apparatus.

The illustrative apparatus includes part of a treating unit to be used, for example, for projecting hot washing solution on metallic articles, such as machinery parts, and includes a portion through which the articles are fed on a conveyer belt 2 of a conveyer 2a. The present invention relates to the conveyer and the other parts of the apparatus will not, therefore, be described further, except in so far as may be necessary for adequate disclosure of the features of construction and of operation of the conveyer.

The treating unit comprises side walls 3 and 4 on which angle plates 5 and 6, respectively, are supported exteriorly. Angle bearing beams 7 are supported by the angle plates 5 and 6, and are secured in position in any suitable manner. The bearing beams 7 serve as supports for a plurality of closely spaced rollers 8 of small diameter, which constitute a roller table and form a part of the conveyer 2a. The rollers 8 may consist of hollow cylindrical members or tubes 9, each of which is supported at its ends by annular members or collars 10 mounted on a shaft 11 and fastened thereto in any suitable manner. The ends of each shaft pass through shields or baffles 12 extending along the inner faces of the side walls 5 and 6 and also through openings in the side walls and through the bearing beams 7, being supported in the bearing beams by suitable means such as ball bearing units 12a fitting in the openings in the bearing beams and having flanges engaging the outer faces of said beams, and being limited as to endwise movement by means which may include collars 13 fixed on the shaft at the outer sides of the ball bearing units in the right hand side wall 4. The openings in the side walls 3 and 4 are sealed by tapered sealing washers or stuffing boxes 14 held in position by holding strips or bars 15 serving as stuffing glands so that the sealing effect will not be disturbed by any slight endwise movement of the shafts.

The conveyer belt 2 is preferably of endless flexible open network type, such as the wire mesh conveyer belt disclosed in Fig. 5, and the upper or active reach or stretch of the belt rests loosely on the rollers 8 and is driven frictionally by means (to be described hereinafter) which includes some or all of said rollers. Due to this arrangement, the driving force applied to the conveyer belt increases as the load thereon increases. However, the drive is entirely frictional and under some conditions where the resistance to movement of the belt becomes too great, the belt may slip relative to the rollers and even be held stationary while the rollers continue in operation, thus avoiding breakage of the conveyer belt or other parts of the apparatus. Heretofore, when either a right or left hand weave conveyer belt of the general type shown in Fig. 5 has been used it has in general been used under tension due to the weight of the idle stretch and has had a tendency to creep or crawl to the right or left in correspondence with the right or left hand weave of the belt. According to the present invention, the loosely mounted conveyer belt is, as brought out hereinafter, relieved of the tension due to the weight of the idle or lower stretch of the conveyer or belt, and has little or no tendency to creep transversely. Any tendency to creep which may remain can easily be overcome.

Due to the manner of supporting the upper or active stretch of the belt 2 on the rollers 8 there is very little tension on the belt due to the weight of the articles carried thereby. If, however, the lower stretch of the belt is supported entirely by suspension from the roller 8 there will be useless tension on the belt, which tension will tend to injure the belt as, for example, by stretching the same. To avoid such injurious tendencies the lower or idle stretch of the belt 2 is supported by suitable means such as a device including one or more endless bands, such as chains 16 with their upper stretches preferably supported by suitable means such as guides 17, and with means for driving such endless bands so as to relieve the driving means for the upper stretch of the belt 2.

As illustrated in Figs. 1 and 3, the guides 17 are in the form of channels mounted on members or rods 18 supported at their ends in the side walls 3 and 4 and the chains 16 are mounted on sprockets 19 fixed on a shaft 20 suitably journalled in the side walls 3 and 4 toward the delivery end of the roller table, and on a shaft 21 journalled in the side walls near the receiving end of the roller table, which may be utilized to drive the chains 16 and for this purpose is provided with a sprocket 22 operatively connected with the driving means for the roller table and the conveyer belt 2, which driving means will now be described.

Each of the shafts 11 is provided with a sprocket 23 and all of these sprockets are arranged in a line at one side of the machine for operative engagement with a chain 24 driven in any suitable manner. Heretofore it has been proposed to drive all of the rollers 8 and for that purpose all of the sprockets have been connected with the corresponding rollers and the chain 24 is arranged so that the upper or driving stretch thereof cooperates with all of the sprockets. However, in the preferred form of carrying out the present invention, one of the sprockets 23 is idle with respect to the corresponding roller 8 and the upper stretch of the belt is passed beneath this sprocket so as to rotate it in a direction opposite to that in which the other sprockets 23 are rotated, but in the same direction in which the driving sprocket 22 for the supporting chains 16 must be rotated in order to drive the lower stretch of the belt 2 in the direction opposite to that in which the upper stretch is driven. Operative connection between the idle sprocket 23 and the sprocket 22 may be effected by providing a sprocket 25 coaxial with respect to said idle sprocket and connected therewith to operate as unitary therewith, and a sprocket chain 26 operatively connecting said sprocket 22 and 25. It will be understood that roller 8 and the shaft to which chain 26 is connected is not secured to said shaft as are the other rollers, but may rotate independently of its roller. As in certain machines proposed heretofore the roller driving chain is held in operative engagement with the active sprockets 23 by means of a bar 27 extending along the side of the machine with its lower edge just above the upper side of the chain.

As shown in Fig. 4, excessive sidewise movement or creeping of the lower stretch of the belt 2 while resting on the chains 16 is guarded against by guides in the forms of angles 28 supported on the rods 18 which angles 28 supported on the rods 18 with horizontal flanges extending beneath the edges of the lower stretch of the belt 2 and with vertical flanges in position to be engaged by the edges of the belt. Provision is also made of a drainage board or platform 29 extending across from one side wall of the treating unit to the other and supported on said walls.

The active stretches of the chains 16 are preferably shorter than the roller table and it is found desirable to provide supporting idler rollers 30 beneath the ends of the roller table to support the chain between the ends of the roller table and the points where the belt 2 engages the chains 16. Preferably the driving connections are such that the chains 16 tend to drive the lower stretch of the belt faster than the upper stretch thereby effecting automatic take up of the belt as it passes from the discharge end of the roller table and providing slack in the belt between the discharge ends of the chains 16 and the roller 30 at the receiving end of the roller table so that the belt 2 will be under very slight tension as it passes to the roller table. Due to the frictional drive of the lower stretch of the belt 2 there is no danger of producing excessive tension of the belt 2 where it passes off the roller table.

As already stated, Fig. 3 discloses driving connections whereby the supporting and driving chains 16 are driven through an active sprocket 23 (that is, one which drives the corresponding roller 8). These connections include a gear 31 coaxial with the sprocket 23 and rotating therewith, a gear 32 mounted on a shaft 33 and meshing with said gear 31, a sprocket 34 connected with said gear 32, and a chain 35 serving as a driving connection between the sprocket 34 and the sprocket 22 on the shaft 21 at the discharge ends of the chains 16. With this arrangement the roller 8 may be secured to its shaft 11.

While I have illustrated and described in detail certain preferred forms of my invention, it is to be understood that changes may be made therein and the invention embodied in other structures. I do not, therefore, desire to limit myself to the specific constructions illustrated, but intend to cover my invention broadly in whatever form its principle may be utilized.

What is claimed is:—

1. In a conveyer, in combination, an endless flexible conveyer belt, a roller table comprising a multiplicity of rollers on which the active stretch of the conveyer belt rests, sprockets at the ends of said rollers with one of said sprockets idle with respect to the corresponding roller and the other sprockets connected with the corresponding rollers to drive the same, a chain engaging said sprockets to drive the same, and means operatively associated with such idle sprocket for supporting and advancing the idle stretch of said conveyer belt.

2. In a conveyer, in combination, an endless flexible conveyer belt, a roller table comprising a multiplicity of rollers on which the active stretch of the conveyer belt rests, sprockets at the ends of said rollers with one of said sprockets idle with respect to the corresponding roller and the other sprockets connected with the corresponding rollers to drive the same, driving means for said sprockets including a chain engaging all of the driving sprockets at one side but looped around the other sprocket, means for supporting and driving the idle stretch of the conveyer belt and including a shaft by which it is driven, and a driving connection between the idle sprocket and said shaft.

3. In a conveyer, in combination, an endless flexible conveyer belt, a roller table comprising a multiplicity of rollers on which the active stretch of the conveyer belt rests, driving sprockets at the ends of said rollers, driving means for said sprockets including a chain having its upper stretch engaging all of said sprockets at their upper sides, means for supporting and driving the idle stretch of the conveyer belt and including a shaft by which it is driven and a sprocket on the shaft, a gear connected with one of the roller driving sprockets, a second gear meshing with the first mentioned gear, a sprocket connected with the second gear to rotate therewith, and a chain connecting the last mentioned sprocket with the sprocket of the means for supporting and driving the idle stretch of the conveyer belt.

In testimony whereof I have affixed my signature to this specification.

ERICH R. ZADEMACH.